United States Patent
Singh et al.

(10) Patent No.: US 11,098,629 B2
(45) Date of Patent: Aug. 24, 2021

(54) SENSOR SHIELDS FOR EXHAUST TREATMENT SYSTEMS OF WORK VEHICLES

(71) Applicant: CNH Industrial America LLC, New Holland, PA (US)

(72) Inventors: Samrendra K. Singh, Bolingbrook, IL (US); Hossein Gholizadeh, Chicago, IL (US); Panos Tamamidis, Mount Prospect, IL (US); Salvatore Virgilio, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/750,733

(22) Filed: Jan. 23, 2020

(65) Prior Publication Data

US 2021/0231044 A1 Jul. 29, 2021

(51) Int. Cl.
*F01N 11/00* (2006.01)
*F01N 3/28* (2006.01)
*F01N 3/20* (2006.01)

(52) U.S. Cl.
CPC .......... *F01N 11/00* (2013.01); *F01N 3/2066* (2013.01); *F01N 3/2892* (2013.01)

(58) Field of Classification Search
CPC ....... F01N 11/00; F01N 3/2892; F01N 3/2066
See application file for complete search history.

(56) References Cited

U.S. PATENT DOCUMENTS

| | | | | |
|---|---|---|---|---|
| 4,255,124 A | * | 3/1981 | Baranowski, Jr. | .... B01F 5/0617 239/466 |
| 5,605,399 A | * | 2/1997 | King | ..................... B01F 5/0616 366/337 |

(Continued)

FOREIGN PATENT DOCUMENTS

| DE | 102014222395 A1 | 5/2016 |
|---|---|---|
| GB | 2533353 A | 6/2016 |

(Continued)

OTHER PUBLICATIONS

Praveena, V., et al. "A Review on Various After Treatment Techniques to Reduce NOx Emissions in a CI Engine," Journal of the Energy Institute, vol. 91, Issue 5, Oct. 2018, pp. 704-720. https://www.sciencedirect.com/science/article/pii/S1743967117300260.

(Continued)

*Primary Examiner* — Brandon D Lee
(74) *Attorney, Agent, or Firm* — Rickard K. DeMille; Rebecca L. Henkel (57) ABSTRACT

A sensor assembly for use within a flow conduit, the flow conduit configured to receive a treated exhaust of an exhaust treatment system of a work vehicle, includes an exhaust sensor positioned within the flow conduit between the upstream and downstream ends. Moreover, the exhaust sensor is configured to detect an amount of an emission gas present in the treated exhaust. The sensor assembly further includes a sensor shield positioned within the flow conduit upstream of the exhaust sensor. The sensor shield includes a hub and a plurality of flow divider beams extending from the hub. Additionally, the sensor shield creates a wake area downstream of the hub within which a turbulent exhaust flow is generated as the treated exhaust is directed past the sensor shield. Furthermore, the exhaust sensor is configured to receive the turbulent exhaust flow from the wake area.

18 Claims, 5 Drawing Sheets

(56) References Cited

U.S. PATENT DOCUMENTS

| | | |
|---|---|---|
| 7,549,511 B2 | 6/2009 | Marocco |
| 7,776,280 B2 | 8/2010 | Telford |
| 7,941,995 B2 | 5/2011 | Goss et al. |
| 7,998,423 B2 | 8/2011 | Boorse et al. |
| 8,359,832 B2 | 1/2013 | Yi et al. |
| 8,539,761 B2 | 9/2013 | Lebas et al. |
| 8,635,858 B2 | 1/2014 | Levin et al. |
| 8,695,330 B2 | 4/2014 | Davidson et al. |
| 8,820,050 B2 | 9/2014 | Dubkov et al. |
| 8,844,270 B2 | 9/2014 | Wagner et al. |
| 8,966,965 B2 | 3/2015 | Driscoll et al. |
| 8,999,276 B1 | 4/2015 | Bui |
| 9,027,330 B2 | 5/2015 | Edholm |
| 9,221,016 B2 | 12/2015 | Van Niekerk et al. |
| 9,295,946 B2 | 3/2016 | Lamps et al. |
| 9,302,223 B2 | 4/2016 | Bui et al. |
| 9,435,240 B2 | 9/2016 | Sampath et al. |
| 9,587,545 B2 | 3/2017 | Venkataraghavan |
| 9,598,999 B2 | 3/2017 | De Rudder et al. |
| 9,707,525 B2 | 7/2017 | De Rudder et al. |
| 9,737,907 B2 | 8/2017 | Hornback et al. |
| 9,945,278 B2 | 4/2018 | Wright et al. |
| 10,086,333 B2 | 10/2018 | Denton et al. |
| 10,179,315 B2 | 1/2019 | Brandl et al. |
| 2007/0245718 A1* | 10/2007 | Cheng ............... B01F 5/0616 60/286 |
| 2009/0035194 A1 | 2/2009 | Robel et al. |
| 2009/0173063 A1 | 7/2009 | Boorse et al. |
| 2012/0204541 A1 | 8/2012 | Li et al. |
| 2015/0078976 A1* | 3/2015 | Bui ............... B01F 5/0057 423/212 |
| 2016/0123209 A1* | 5/2016 | Wright ............... F01N 3/2892 60/301 |
| 2017/0282135 A1 | 10/2017 | Whitten et al. |

FOREIGN PATENT DOCUMENTS

| | | |
|---|---|---|
| JP | 3580163 B2 | 10/2004 |
| KR | 100844750 B | 7/2008 |

OTHER PUBLICATIONS

Jain, Mohit, et al. "Secondary Breakup of a Drop at Moderate Weber Numbers," The Royal Society Publishing, Proc. R. Soc. A471:20170930. http://dx.doi.org/10.1098/tspa.2014.0930.

* cited by examiner

SENSOR SHIELDS FOR EXHAUST TREATMENT SYSTEMS OF WORK VEHICLES

FIELD

The present subject matter relates generally to the treatment of engine exhaust gases generated by work vehicles and, more particularly, to sensor shields for use within exhaust treatment systems of work vehicles for increasing the accuracy or reliability of a downstream exhaust sensor.

BACKGROUND

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel exhaust fluid (DEF) or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system to allow the reductant to be reacted with a catalyst in order to reduce the amount of nitrous oxide (NOx) emissions contained within the engine exhaust. A NOx sensor is typically positioned downstream of the SCR system to monitor the amount of NOx emissions still remaining in the exhaust flow exiting the exhaust treatment system. The data from the sensor may, for example, be used to control the combustion temperature of the engine and/or the amount of reductant injected into the mixing chamber to ensure that the amount of NOx emissions remains below a given amount.

Many SCR systems include multiple different catalyst lines, which are combined upstream of the NOx sensor. However, in many instances, the engine exhaust associated with separate catalyst lines may not be fully mixed before encountering the NOx sensor. As such, the NOx sensor may underestimate or overestimate a concentration of NOx within the exhaust gas associated with the exhaust treatment system. Overestimating the amount of NOx within the engine exhaust may result in an excessive amount of the reductant being injected into the engine exhaust. This can lead to clogging of the catalyst lines, increased reductant consumption, higher backpressure within the exhaust treatment system, and/or increased ammonia slip within the exhaust treatment system. Contrarily, injecting an inadequate amount of the reductant may lead to excessive NOx emissions contained within the engine exhaust gas. Additionally, the exhaust gas my contain liquid droplets that can impinge on the NOx sensor and cause damage to the NOx sensor or negatively affect the performance of the NOx sensor, such as lowering the accuracy of the NOx sensor.

Accordingly, an improved sensor assembly that increases the accuracy of an exhaust sensor positioned within a flow conduit of an exhaust treatment system would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a sensor assembly for use within a flow conduit of an exhaust treatment system of a work vehicle. The flow conduit including an upstream end and a downstream end and is configured to receive a treated exhaust at the upstream end for flow towards the downstream end. The sensor assembly includes an exhaust sensor positioned within the flow conduit between the upstream and downstream ends. Moreover, the exhaust sensor is configured to detect an amount of an emission gas present in the treated exhaust. The sensor assembly further includes a sensor shield positioned within the flow conduit upstream of the exhaust sensor. The sensor shield includes a hub and a plurality of flow divider beams extending from the hub. Additionally, the sensor shield creates a wake area downstream of the hub within which a turbulent exhaust flow is generated as the treated exhaust is directed past the sensor shield. Furthermore, the exhaust sensor is configured to receive the turbulent exhaust flow from the wake area.

In another aspect, the present subject matter is directed to an exhaust treatment system for a work vehicle. The exhaust treatment system includes a selective catalytic reduction (SCR) system configured to react a mixture of exhaust reductant and engine exhaust with a catalyst to generate a treated exhaust. The SCR system further includes an SCR outlet for expelling the treated exhaust therefrom. The exhaust treatment system also includes a flow conduit including an upstream end and a downstream end, the flow conduit in fluid communication with the SCR outlet for receiving the treated exhaust expelled from the SCR system. The exhaust treatment system additionally includes an exhaust sensor positioned within the flow conduit between the upstream and downstream ends. Moreover, the exhaust sensor is configured to detect an amount of an emission gas present in the treated exhaust. The exhaust treatment system further includes a sensor shield positioned within the flow conduit upstream of the exhaust sensor. The sensor shield includes a hub and a plurality of flow divider beams extending from the hub. Additionally, the sensor shield creates a wake area downstream of the hub within which a turbulent exhaust flow is generated as the treated exhaust is directed past the sensor shield. Furthermore, the exhaust sensor is configured to receive the turbulent exhaust flow from the wake area.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sensor assembly suitable for use within a fluid conduit of an exhaust treatment system for a work vehicle. The flow conduit generally includes upstream and downstream ends and is configured to receive a treated exhaust at the upstream end and flow such treated gas towards the downstream end. The sensor assembly includes an exhaust sensor positioned within the flow conduit between the upstream and downstream ends. The exhaust sensor is configured to detect an amount of an emission gas present in the treated exhaust, such as an amount of NOx contained within the treated exhaust. The sensor assembly further includes a sensor shield positioned within the flow conduit upstream of the exhaust sensor. The sensor shield is positioned such that the treated exhaust must generally impact the sensor shield before encountering the exhaust sensor.

In one embodiment, the sensor shield includes a hub (e.g., generally positioned at a center of the sensor shield) and a plurality of flow divider beams extending from the hub. Additionally, in one embodiment, the sensor shield is configured to create a wake area downstream of the hub within which a turbulent exhaust flow is generated as the treated exhaust is directed past the sensor shield, with the turbulent exhaust flow from the wake area being subsequently received by the downstream exhaust sensor. The hub may generally prevent the treated exhaust from flowing directly from the upstream end of the flow conduit and impinging on the exhaust sensor. For instance, treated exhaust impacting the hub and/or flow divider beams may create turbulence within the exhaust flow prior to such exhaust flow being directed into the wake area. In several embodiments, the flow divider beams are configured to funnel treated exhaust at different positions within the flow conduit towards the wake area. In at least one embodiment, the funneled, treated exhaust at the different positions may be associated with treated flow of different catalyst lines of an associated SCR system of the exhaust treatment system. As such, the treated exhaust funneled to the wake area may be mixed in order to form a more homogenous turbulent exhaust as compared to the treated exhaust. Furthermore, the treated exhaust may be simultaneously accelerated and/or turned as it flows around the flow divider beams and is funneled towards the wake area. Such acceleration and turning may shed liquid particles contained within the treated exhaust.

The sensor shield is therefore configured to promote mixing of portions of the treated exhaust by introducing turbulence into one or more of the exhaust flow portions and funneling such portions of the exhaust towards the wake area. By more effectively mixing the treated exhaust flow portions within the wake area, the sensor readings from the downstream exhaust sensor may more accurately represent harmful or undesirable gas emissions within the treated exhaust flow as a whole. Furthermore, an associated controller may implement a control action, such as adjusting the combustion temperature of the engine and/or varying the amount of reductant injected into the exhaust treatment system, based on a more accurately determined amount of exhaust emissions contained within the treated exhaust flow. As such, the disadvantages associated with inaccurate emissions readings may be reduced or eliminated. For instance, overestimation of the amount of emissions within the exhaust flow may be avoided and thus prevent or reduce the amount of reductant injected in response. Several issues associated with excessive reductant injection may thus be avoided, such as clogging of the catalyst lines, increased reductant consumption, higher backpressure within the exhaust treatment system, and/or increased ammonia slip within the exhaust treatment system. Similarly, issues associated with inadequate reductant injection in response to underestimation of the amount of emissions within the engine exhaust flow may similarly be avoided, such as excessive NOx emissions contained within the treated exhaust flow. In addition, by shedding liquid droplets within the treated exhaust forming the turbulent exhaust, the likelihood of such liquid droplets impinging on or otherwise contacting the exhaust sensor may be reduced and thus, by extension, substantially reduce a likelihood of sensor failure or damage due to liquid droplets impinging on or otherwise contacting the exhaust sensor.

Furthermore, a suitable sensor shield as described herein may be a simple addition to the assembly process of exhaust treatment systems and/or may easily be installed into pre-existing exhaust treatment systems. For instance, several embodiments of the disclosed sensor shield may be easily manufactured and assembled and have minimal spacing requirements within the flow conduit. Additionally, the sensor shield described herein may have a very small cross-sectional footprint within the flow conduit and thus have minimal effects on the system backpressure.

Figure 1:
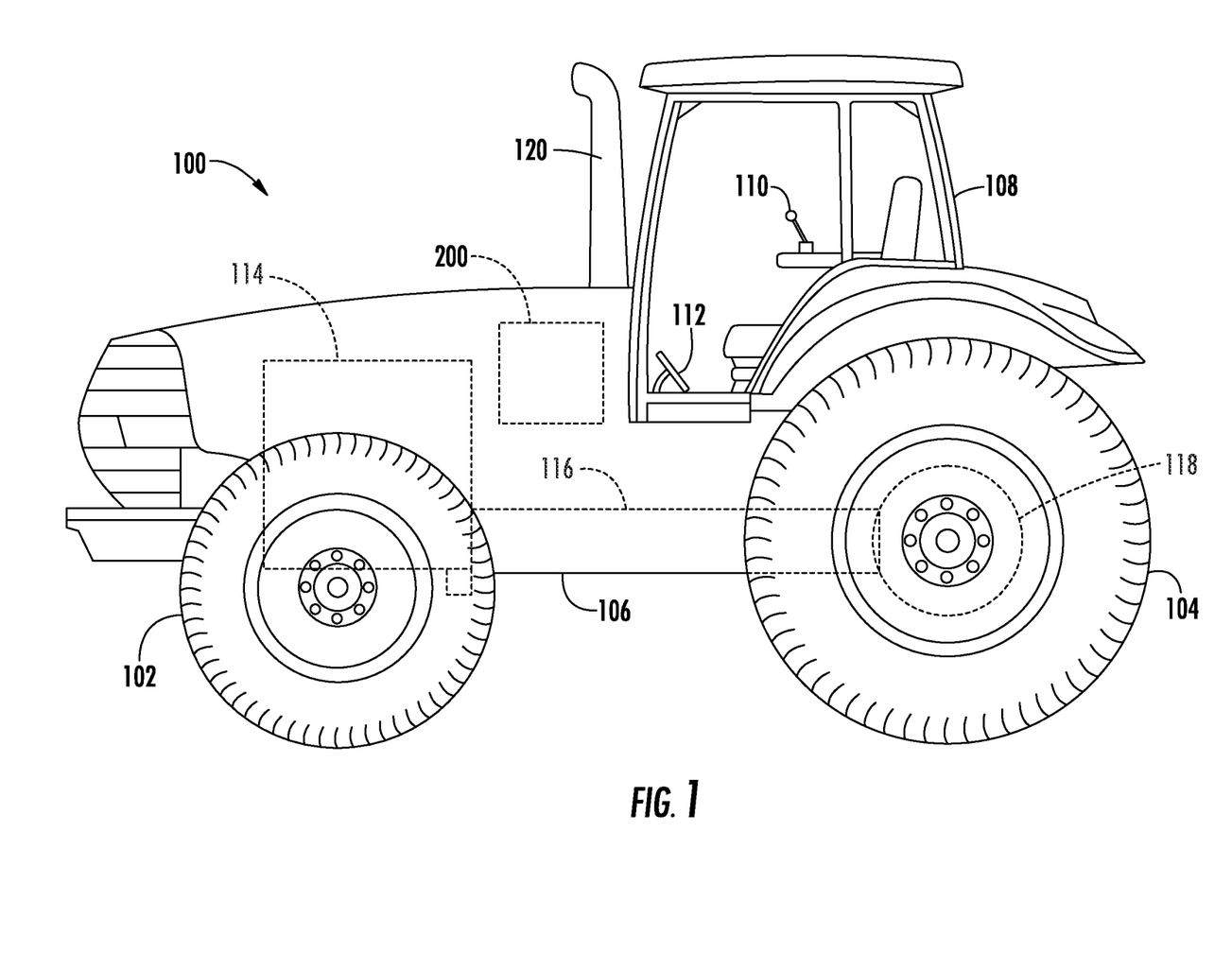
FIG. 1 illustrates a side view of one embodiment of a work vehicle in accordance with aspects of the present subject matter.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. An operator's cab 108 may be supported by a portion of the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount emissions contained within the exhaust from the engine 114. For instance, engine exhaust expelled from the engine 114 may be directed through the exhaust treatment system 200 to allow the levels of nitrous oxide (NOx) emissions contained within the exhaust to be reduced significantly. The cleaned or treated exhaust gases may then be expelled from the exhaust treatment system 200 into the surrounding environment via an exhaust pipe 120 of the work vehicle 100.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 114, transmission 116, and differential 118 are coupled, a configuration common in smaller tractors. Still, other configurations may use an articulated chassis to steer the work vehicle 100 or rely on tracks in lieu of the wheels 102, 104. Additionally, although not shown, the work vehicle 100 may also be configured to be operably coupled to any suitable type of work implement, such as a trailer, spray boom, manure tank, feed grinder, plow, and/or the like.

Figure 2:
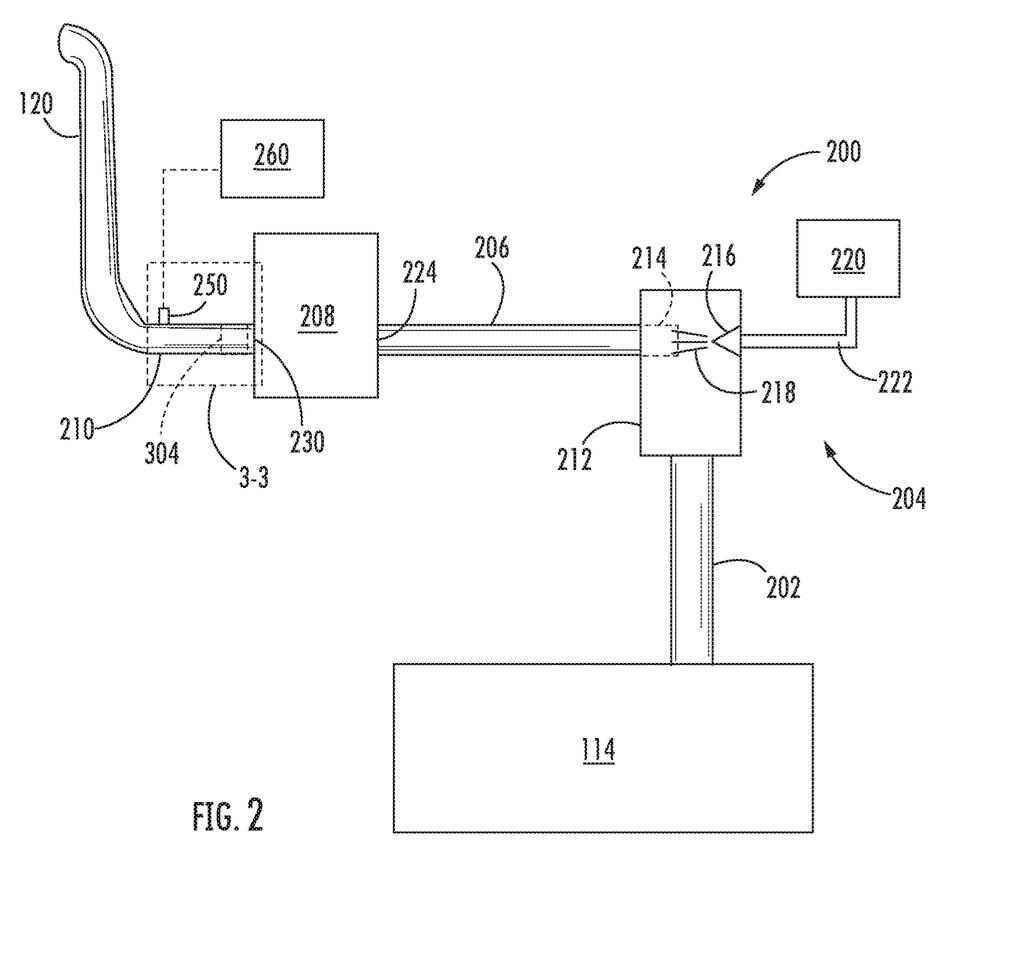
FIG. 2 illustrates a schematic view of one embodiment of an exhaust treatment system suitable for use with a work vehicle in accordance with aspects of the present subject matter.

Referring now to FIG. 2, a schematic view of one embodiment of an exhaust treatment system suitable for use with a work vehicle is illustrated in accordance with aspects of the present subject matter. As represented in FIG. 2, the exhaust treatment system 200 includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust. For example, as shown in FIG. 2, the DOC system 204 includes a canister or chamber 212 for receiving engine exhaust from the exhaust conduit 202, with the chamber 212 being in flow communication with an upstream end 214 of the mixing conduit 206. In addition, the DOC system 204 includes a reductant injector nozzle 216 provided in association with the chamber 212 at a location at or adjacent to the upstream end 214 of the mixing conduit 206 to allow an exhaust reductant 218, such as a diesel exhaust fluid (DEF) or any other suitable urea-based fluid, to be injected into the stream of exhaust gases flowing through the chamber 212. For instance, as shown in FIG. 2, the reductant injector nozzle 216 may be fluidly coupled to a source of exhaust reductant (e.g., storage tank 220) via a hose or other fluid coupling 222 to allow liquid exhaust reductant to be supplied to the nozzle 216.

The engine exhaust and exhaust reductant flowing into the upstream end 214 of the mixing conduit 206 are then directed through the conduit 206 to the downstream end 224 thereof for receipt by the SCR system 208, within which the mixture of exhaust/reductant is reacted with a catalyst to generate a treated exhaust flow in which the amount of harmful or undesirable gas emissions has been reduced as compared to the engine exhaust initially discharged from the engine 114. In one embodiment, the SCR system 208 may define multiple catalyst lines. For instance, the SCR system 208 may house multiple SCR chambers defining, at least in part, separate catalyst lines and associated flowpaths through the SCR system 208. Furthermore, the SCR system 208 may be configured to combine and mix the treated exhaust flow from the separate catalyst lines into a total treated exhaust flow before being expelled from the SCR outlet 230 of the SCR system 208, e.g., into the downstream flow conduit 210. For instance, the SCR system 208 may include an outlet chamber positioned proximate to the SCR outlet 230 configured to promote mixing of the treated exhaust flows from separate catalyst lines. The total treated exhaust flow is then expelled from a SCR outlet 230 of the SCR system 208 and is directed through the downstream flow conduit 210 for discharge into the atmosphere (e.g., via an exhaust pipe 120 forming part of or coupled to the downstream flow conduit 210).

Additionally, as shown in FIG. 2, the exhaust treatment system 200 includes an exhaust sensor 250 positioned within the downstream flow conduit 210 to monitor the concentration or amount of emissions remaining within the exhaust flow following treatment within the SCR system 208. In one embodiment, the exhaust sensor 250 comprises one or more nitrous oxide (NOx) sensors configured to detect the amount of NOx contained within the treated exhaust flow. However, in other embodiments, the exhaust sensor 250 may comprise any other suitable sensors or combination of sensors configured to detect the concentration or amount of gaseous emissions contained within the treated exhaust flow, including the detection of gaseous emissions other than NOx and/or the detection of NOx in combination with one or more other gaseous emissions. As shown, in FIG. 2, in one embodiment, the exhaust sensor 250 is communicatively coupled to a controller 260 (e.g., a computing device or another other suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 100 based on such comparison, such as by adjusting the combustion temperature of the engine 114 and/or varying the amount of reductant injected into the DOC system 204 to ensure that the exhaust emissions remain below a predetermined limit or threshold.

Moreover, the exhaust treatment system 200 may also include a sensor shield 304 positioned within the downstream flow conduit 210 upstream of the exhaust sensor 250, such as at or adjacent to the outlet 230 of the SCR system 208. As will be described in greater detail below, the sensor shield 304 may be configured to generate turbulence within the treated exhaust flow expelled from the SCR system 208. Such turbulent flows may facilitate enhanced mixing of the treated exhaust immediately upstream of the exhaust sensor 250, thereby allowing the sensor 250 to provide more accurate data related to the concentration or amount of the gaseous emission(s) being monitored (e.g., NOx). In addition, the sensor shield 304 may impede any water or other liquid droplets contained within the treated exhaust flow from impinging or otherwise contacting the exhaust sensor 250.

Figure 3:
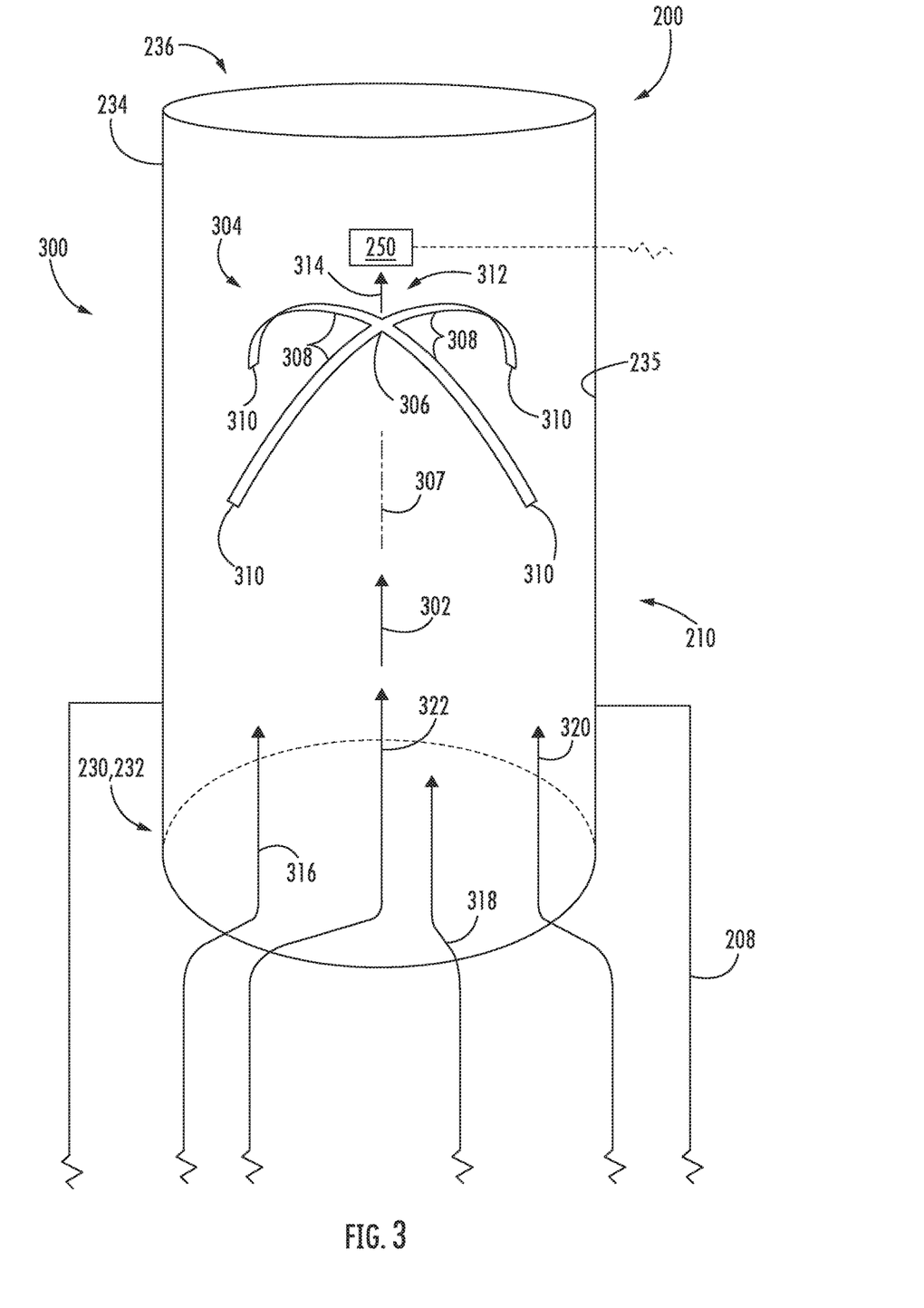
FIG. 3 illustrates a pictorial view of one embodiment of a portion of the disclosed exhaust treatment system in accordance with aspects of the present subject matter, particularly illustrating a sensor assembly including a sensor shield within a downstream flow conduit contained within box 3-3 shown in FIG. 2.

Referring now to FIG. 3, a pictorial view of one embodiment of a portion of the exhaust treatment system 200 shown in FIG. 2 is illustrated in accordance with aspects of the present subject matter. Specifically, FIG. 3 illustrates a pictorial view of a sensor assembly 300 including a sensor shield 304 located within the portion of the downstream flow conduit 210 contained within box 3-3 shown in FIG. 2. Particularly, FIG. 3 illustrates the sensor shield 304 positioned adjacent the outlet 230 of the SCR system 208 and the exhaust sensor 250 positioned downstream of the sensor shield 304. In general, the sensor assembly 300 will be described herein with reference to the exhaust treatment system 200 and work vehicle 10 described above with reference to FIGS. 1 and 2. However, it should be appreciated by those of ordinary skill in the art that the disclosed sensor assembly 300 may generally be utilized with work vehicles and/or exhaust treatments systems having any other suitable work vehicle configuration and/or exhaust treatment system configuration, respectively.

In general, the sensor shield 304 of the sensor assembly 300 is positioned within the flow conduit 210 upstream of the exhaust sensor 250 in order to introduce turbulence within a treated exhaust 302 (which may include multiple treated exhaust flow portions 316, 318, 320, 322 corresponding to separate catalyst lines of the SCR system 208) in order to generate a turbulent exhaust flow 314 that is more homogenously mixed as compared to the treated exhaust 302. By more evenly mixing the treated exhaust 302, the resulting turbulent exhaust flow 314 encountering the exhaust sensor 250 may more accurately represent the concentration or amount of emissions remaining within the treated exhaust 302. Furthermore, a central portion or hub 306 of the sensor shield 306 may prevent liquid particles within the treated exhaust 302 from impinging on the exhaust sensor 250, which may prevent damage to the exhaust sensor 250 and generally increase the accuracy of the exhaust sensor 250.

As shown in FIG. 3, the flow conduit 210 may include an upstream end 232 and a downstream end 234. For instance, the downstream end 234 may correspond to an exhaust pipe 120 forming part of or coupled to the flow conduit 210 as described above with reference to FIG. 2. The flow conduit 210 may receive the treated exhaust 302 expelled from the SCR outlet 230 of the SCR system 208 at the upstream end 232 of the flow conduit 210 for flow towards the downstream end 234. As explained above, the treated exhaust 302 may include exhaust flow portions 316, 318, 320, 322 associated with distinct catalyst lines of the SCR system 208 (e.g., including more exhaust gas treated within one of the catalyst lines of the SCR system 208 as compared to the exhaust gas treated within the other catalyst lines). For instance, the exhaust flow portions 316, 318, 320, 322 of the treated exhaust 302 may not be adequately mixed within an outlet chamber of the SCR system 208 before being expelled from the SCR outlet 230. Furthermore, the harmful or undesirable gas emissions may not be reduced to the same or similar degrees within the separate catalyst lines of the SCR system 208. As such, the exhaust sensor 250 may otherwise encounter more of one of the exhaust flow portions 316, 318, 320, 322 of the treated exhaust 302, which may inaccurately represent the amount or concentration of harmful or undesirable gas emissions within the treated exhaust 302 as a whole, thereby potentially resulting in too much or too little reductant being injected into the engine exhaust. While the embodiment of the SCR system 208 depicted in FIG. 3 illustrates four exhaust flow portions of the treated exhaust 302, it should be appreciated the SCR system 208 may define more or less catalyst lines corresponding to additional or fewer portions of the treated exhaust 302. For example, the SCR system 208 may define one catalyst line such that the treated exhaust 302 does not include individual portions associated with respective catalyst lines.

In order to promote more effective mixing of the exhaust flow portions 316, 318, 320, 322 of the treated exhaust 302 and/or to reduce the liquid particles within the exhaust encountering the exhaust sensor 250, the sensor shield 304 is positioned within the downstream flow conduit 310 immediately upstream of the exhaust sensor 250. As shown in FIG. 3, the sensor shield 304 includes a central portion or hub 306 positioned at the center of the sensor shield 304. For instance, the hub 306 may be aligned with or extend radially outwardly from a centerline 307 of the sensor shield 304. The hub 306 may generally be configured as a bluff body that prevents the treated exhaust 302 from flowing directly downstream from the SCR outlet 230 and impacting the exhaust sensor 250. As such, the treated exhaust 302 must turn and flow around the hub 306 and into a wake area 312 created downstream of the hub 306 and immediately upstream of the exhaust sensor 250. Additionally, as shown in the illustrated embodiment, the sensor shield 304 may include a number of flow divider beams 308 extending from the hub 306 to respective distal ends 310. The flow divider beams 308 may be coupled or otherwise fixed to or formed with the hub 306. In one embodiment, the treated exhaust 302 may be split by the flow divider beams 308 such that the treated exhaust 302 must turn and flow around the flow divider beams 308. In certain embodiments, at least a portion of the treated exhaust 302 flowing around the flow divider beams 308 may generally be funneled along the flow divider beams 308 from the distal ends 310 of the flow divider beams 308 towards the central wake area 312 downstream of the hub 306.

It should be appreciated that turning the treated exhaust 302 around the hub 306 and/or turning the treated exhaust 302 around the flow divider beams 308 and funneling such exhaust towards the central wake area 312 may introduce turbulence into such treated exhaust 302. By introducing turbulence, the treated exhaust 302 may be more thoroughly mixed within the wake area 312 and form a more homogenously mixed turbulent exhaust flow 314 within the wake area 312. Additionally, or alternatively, turning the treated exhaust 302 around the hub 306 and/or the flow divider beams 308 and into the wake area 312 may cause any liquid contained within the treated exhaust 302 to be reduced or eliminated. For instance, the treated exhaust 302 may generally accelerate in order to be turned into the wake area 312. Accelerating the treated exhaust 302 in such a fashion generally causes substances within the treated exhaust 302, such as liquid droplets, to be shed from the treated exhaust 302. Specifically, the momentum of liquid droplets within the treated exhaust 302 may cause the liquid droplets to continue downstream and not turn into the wake area 312 with the associated treated exhaust 302. Furthermore, the turbulence generated within the wake area 312 may facilitate the primary break-up of liquid droplets contained within the treated exhaust 302 by increasing the Weber number (We) associated with the liquid droplets and also promoting the secondary break-up or atomization of the liquid droplets by reducing the characteristic atomization timescale. Such improved droplet break-up and atomization results in smaller droplet sizes within the turbulent exhaust flow 314, and the higher turbulence enhances the evaporation of the remaining droplets. Accordingly, the likelihood of liquid droplets impinging against the exhaust sensor 250 may be reduced significantly, thereby reducing the potential for sensor damage due to such liquid droplet impingements. As such, the turbulent exhaust flow 314 generated within the wake area 312 may generally be more thoroughly mixed and contain less liquid droplets as compared to the treated exhaust 302 received within the upstream end 232 of the flow conduit 210.

In the illustrated embodiment of FIG. 3, the sensor shield 304 includes four flow divider beams 308. In certain embodiments, the sensor shield 304 may include a flow divider beam 308 for each portion 316, 318, 320, 322 of the treated exhaust 302 corresponding to the distinct catalyst lines of the SCR system 208. As such, the sensor shield 304 may include more or less flow divider beams 308 to match the number of catalyst lines of the SCR system 208. In alternative embodiments, the number of flow divider beams 308 may be independent of the number of catalyst lines of the SCR system 208. For example, the sensor shield 304 may include more or less flow divider beams 308 notwithstanding the number of catalyst lines defined within the SCR system 208. Additionally, or alternatively, each flow divider beam 308 may be curved between the hub 306 and its distal end 310. In such an embodiment, the treated exhaust 302 funneled within a curved flow divider beam may be turned to a greater degree than if such curve was absent. Thus, the amount of liquid particles shedded by the treated exhaust 302 turned along the curve of the flow divider beams 308 from the distal ends 310 towards the hub 306 may be increased.

The sensor shield 304 may generally be supported within the flow conduit 210 by the flow divider beams 308. For example, the distal ends 310 of the flow divider beams 308 may be coupled to an interior surface 235 of the flow conduit 210 using any suitable means, such as welding, adhesives, fasteners, friction fit, or the like. For example, in one embodiment, the sensor shield 304 may be inserted within the upstream end 232 of the flow conduit 210, e.g., positioned directly upstream of the exhaust sensor 250, and retained within the flow conduit 210 via friction. In such an embodiment, the sensor shield 304 may be sized slightly larger than the interior of the flow conduit 210, and the flow divider beams 308 may be configured to deflect or bend. It should be appreciated that bending the flow divider beams 308 may generate a radially outward (relative to the centerline 307 of the sensor shield 304) spring force such that the position of the sensor shield 304 is generally fixed.

Additionally, the disclosed sensor assembly 300 may include the exhaust sensor 250 as described generally above and arranged within the flow conduit 210 downstream of the sensor shield 304. For example, the exhaust sensor 250 may be configured to allow the concentration or amount of emissions remaining within the turbulent exhaust flow 314 to be monitored. The exhaust sensor 250 may be configured to generally extend radially inwardly from the interior surface 235 of the flow conduit 210 such that at least a portion of the sensor 250 is positioned directly within and/or otherwise directly exposed to the turbulent exhaust flow 314 flowing downstream of the wake area 312. In this regard, it should be noted that the exhaust sensor 250 may be shielded or otherwise protected from the flow of treated exhaust 302 via the sensor shield 304. As such, the turbulent exhaust flow 314 containing less liquid droplet and/or more thoroughly mixed exhaust gases may flow across the exhaust sensor 250 to allow the sensor 250 to provide accurate data relating to the gaseous emission(s) being monitored. Furthermore, the controller 260 (FIG. 2) may implement a control action, such as adjusting the combustion temperature of the engine 114 and/or varying the amount of reductant injected into the DOC system 204, based on a more accurately determined amount of exhaust emissions contained within the treated exhaust 302.

Referring now to FIG. 4, a pictorial view of one embodiment of the sensor shield 304 and related sensor assembly 300 described above with reference to FIG. 3 is illustrated in accordance with aspects of the present subject matter. Particularly, FIG. 4 illustrates the flow divider beams 308 of the sensor shield 304 configured as curved flow divider beams 308, with each beam 308 defining a curved cross-section. It should be appreciated that aspects of the depicted sensor shield 304 and sensor assembly 300 may be utilized within any suitable exhaust treatment system of a given work vehicle. The sensor shield 304 of FIG. 4 may generally be configured the same as or similar to the sensor shield 304 of FIG. 3. For instance, sensor shield 304 may include a hub 306 and a plurality of flow divider beams 308 extending from the hub 306 to respective distal ends 310. Further, the sensor shield 304 may be configured to introduce turbulence within the engine exhaust 302 and reduce the amount of liquid particles within such engine exhaust 302 to form a turbulent exhaust flow 314 within a wake area 312 for subsequent delivery to an exhaust sensor 250.

As shown, each of the flow divider beams 308 may include an upstream surface 326 and downstream edges 328. In one embodiment, the upstream surface 326 may be curved or arcuate such that each flow divider beam 308 defines a curved cross-sectional shape between its downstream edges 328. For example, each flow divider beam 308 may, in one embodiment, define a U-shaped cross-section 333. Additionally, the flow divider beams 308 may define divider flowpaths 317, 319, 321, 323 downstream of the upstream surfaces 326 and between the downstream edges 328 for funneling treated exhaust 302 towards the wake area 312 created downstream of the hub 306. For example, the divider flowpaths 317, 319, 321, 323 may extend between the distal end 310 of each flow divider beam 308 to the hub 306 for funneling portions of the treated exhaust 302 from the distal ends 310 of the beams 308 to the wake area 312. In such an embodiment, the wake area 312 may be defined by a bowl extending from the hub 306 along walls of the flow divider beams 308 to the respective downstream edges 328 of the flow divider beams 308 adjacent to the hub 306, serving as the rim of the bowl defining the wake area 312. However, the divider flowpaths 317, 319, 321, 323 may generally form voids or holes in the structure of the sensor shield 304 defining the wake area 312.

Furthermore, treated exhaust 302 flowing adjacent to the downstream edges 328 of each flow divider beam 308 may be turned into the divider flowpaths 317, 319, 321, 323 (e.g., turned exhaust represented by arrows 324) such that the turned exhaust 324 flowing along the length of the flow divider beams 308 is funneled towards the wake area 312. Additionally, each flow divider beam 308 may define a cross-sectional length between the upstream surface 326 and downstream edges 328 along the length of the flow divider beam 308. As shown, the cross-sectional length may increase from the distal end 310 of each flow divider beam 308 (e.g., a first cross-sectional length 330) to the hub 306 (e.g., a second cross-sectional length 332). As such, turned exhaust 324 proximate to the hub 306 may be required to turn to a greater degree than turned exhaust 324 proximate to the distal ends 310 of the flow divider beams 308. Turning exhaust entering the divider flowpaths 317, 319, 321, 323 closer to the hub 306 to a greater degree may introduce greater turbulence and shed a greater amount of liquid particles than the turned exhaust 324 closer to the distal ends 310 of the flow divider beams 308. Such a configuration may improve the mixing of the treated exhaust 302 within the wake area 312 and further reduce liquid particles within the turbulent exhaust flow 314.

Figure 4:
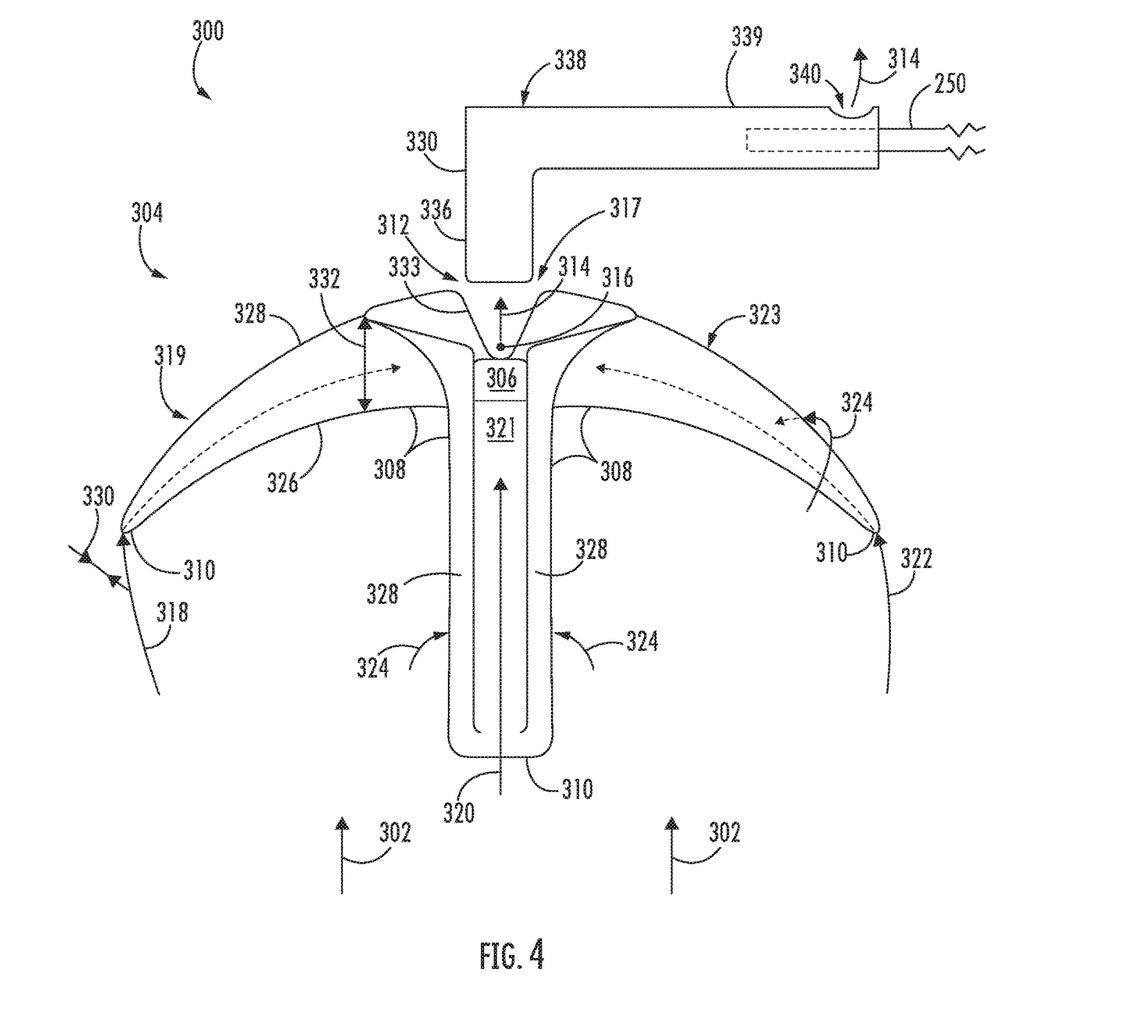
FIG. 4 illustrates a pictorial view of one embodiment of a sensor shield of a sensor assembly suitable for use within the disclosed exhaust treatment system in accordance with aspects of the present subject matter, particularly illustrating a plurality of flow divider beams of the sensor shield configured as curved beams.

In at least one configuration of the sensor shield 304, as shown in FIG. 4, the sensor shield 304 may be oriented such that the flow divider beams 308 each funnel a portion of the treated exhaust 302 associated with an individual catalyst line to the wake area 312. For example, a flow divider beam 308 may be oriented to funnel a first exhaust flow portion 316 of the treated exhaust 302 within a first divider flow path 317. Another flow divider beam 308 may be oriented to funnel a second exhaust flow portion 318 of the treated exhaust 302 within a second divider flow path 319. An additional flow divider beam 308 may be oriented to funnel a third exhaust flow portion 320 of the treated exhaust 302 within a third divider flow path 321. A further flow divider beam 308 may be oriented to funnel a fourth exhaust flow portion 322 of the treated exhaust 302 within a fourth divider flow path 323. As such, the exhaust flow portions 316, 318, 320, 322 of the treated exhaust 302 may flow down their respective divider flowpaths 317, 319, 321, 323 for mixing within the wake area 312 to form the more homogeneously mixed turbulent exhaust flow 314.

In several embodiments, the sensor assembly 300 may include a sensor conduit 330 housing the exhaust sensor 250. For example, as shown in FIG. 4, sensor conduit 330 may include an upstream end 336 and a downstream end 339 defining a suction flowpath 338 extending between the upstream end 336 and the downstream end 339. In one embodiment, the exhaust sensor 250 may generally be placed within the downstream end 339. Generally, the sensor conduit 330 may be configured to place the exhaust sensor 250 in flow communication with the wake area 312 positioned immediately downstream of the sensor shield 304 such that the exhaust sensor 250 is configured to detect the amount of emissions within the turbulent exhaust flow 314 while reducing any other treated exhaust 302 from encountering the exhaust sensor 250.

For example, in the illustrated embodiment, an inlet 317 at the upstream end 336 of the sensor conduit 330 may be positioned within or adjacent to the wake area 312 to receive the turbulent exhaust flow 314. Additionally, the sensor conduit 330 may define an outlet 340 generally at the downstream end 339 to expel the turbulent exhaust 314 flowing through the suction flowpath 338 and past the exhaust sensor 250. Particularly, the treated exhaust 302 flowing past the outlet 340 generates the flow of the turbulent exhaust 314 through the suction flowpath 338. For example, the wake area 312 may generally correspond to a stagnation zone within the flow conduit 210 corresponding to a high pressure area. Further, the flow of the treated exhaust 302 past the outlet 340 may correspond to a low pressure area due to the velocity of such treated exhaust 302. As such, the pressure differential between the inlet 317 and the outlet 340 may generate a suction force within the sensor conduit 330 that directs the turbulent exhaust flow 314 through the suction flowpath 338 and over the exhaust sensor 250 before being expelled at the outlet 340, allowing the exhaust sensor 250 to determine the amount of emissions within the turbulent exhaust 314.

Figure 5:
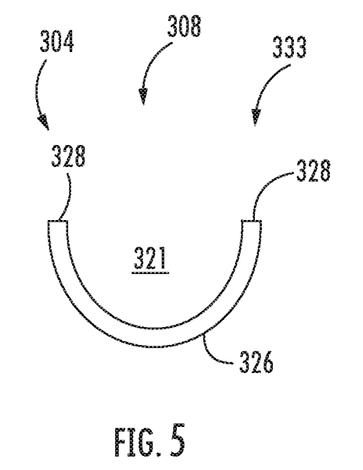
FIG. 5 illustrates a cross-sectional view of one embodiment of a flow divider beam suitable for use with the disclosed sensor shield, particularly illustrating an embodiment of a flow divider beam having a U-shaped cross-section.
Figure 6:
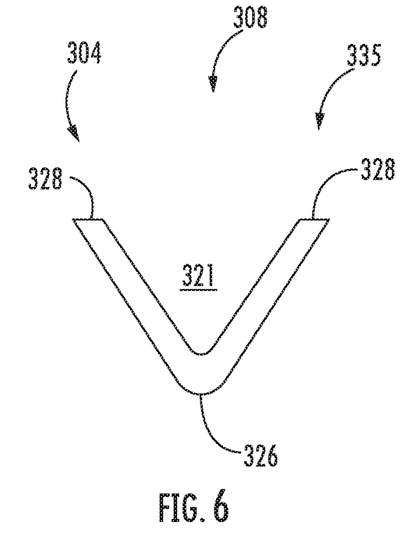
FIG. 6 illustrates a cross-sectional view of another embodiment of a flow divider beam suitable for use with the disclosed sensor shield, particularly illustrating an embodiment of a flow divider beam having a V-shaped cross-section.
Figure 7:
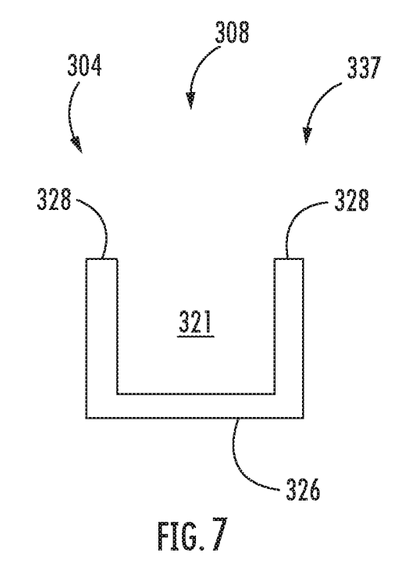
FIG. 7 illustrates a cross-sectional view of a further embodiment of a flow divider beam suitable for use with the disclosed sensor shield, particularly illustrating an embodiment of a flow divider beam having a rectangular-shaped cross-section.

Referring now to FIGS. 5-7, multiple views of different embodiments of flow divider beams including different cross-sectional shapes are illustrated in accordance with aspects the present subject matter. It should be appreciated that any embodiment of the flow divider beams 308 described herein with reference to FIGS. 5-7 may be utilized as one or more of the flow divider beams 308 of the sensor shield 304 as described above with reference to FIGS. 3 and 4. Particularly, FIG. 5 illustrates an embodiment of a flow divider beam 308 having a U-shaped cross-section 333. FIG. 6 illustrates an embodiment of a flow divider beam 308 having a V-shaped cross-section 335. FIG. 7 illustrates an embodiment of a flow divider beam 308 having a rectangular-shaped cross-section 337. While the embodiments of FIGS. 5-7 are illustrated in the context of the flow divider beam 308 defining the third divider flowpath 321 described above with reference to FIG. 4, it should be appreciated the aspects of the depicted flow divider beams 308 may be utilized in association with a flow divider beam 308 defining any other divider flowpath.

Additionally, it should be appreciated that, in alternative embodiments, the flow divider beams 308 of the sensor shield 304 may include any combination of the features described with reference to FIGS. 5-7 or have any other suitable configuration such that the flow divider beams 308 of the sensor shield 304 introduce turbulence within treated exhaust 302 and turn the treated exhaust 302 to reduce liquid particles contained within such treated exhaust 302 flowing through the divider flowpath 321. Furthermore, it should be appreciated that the disclosed embodiments of the flow divider beams 308 may be utilized within any suitable sensor assembly associated with an exhaust treatment system of a given work vehicle.

Referring to the embodiment of FIG. 5, the divider beam 308 is configured to define a U-shaped cross-section 333 (e.g., as also shown in FIG. 4). For example, an upstream surface 326 may define the bottom of the U-shaped cross-section 333, and the downstream edges 328 may define the ends of the U-shaped cross-section 333. As such, the divider flowpath 321 extending along the length of the flow divider beam 308 may also generally be U-shaped. Referring to the embodiment of FIG. 6, the divider beam 308 is configured to define the V-shaped cross-section 335. For example, the upstream surface 326 may define the bottom and/or vertex of the V-shaped cross-section 335, and the downstream edges 328 may define the ends of the V-shaped cross-section 335. As such, the divider flowpath 321 extending along the length of the flow divider beam 308 may also generally be V-shaped. Referring to the embodiment of FIG. 7, the divider beam 308 is configured to define the rectangular-shaped cross-section 337, such as a box shape. For example, the upstream surface 326 may define the bottom of the rectangular-shaped cross-section 337, and the downstream edges 328 may define the ends of the rectangular-shaped cross-section 337. As such, the divider flowpath 321 extending along the length of the flow divider beam 308 may also generally be box or rectangular-shaped. In additional or alternative embodiments, any of the flow divider beams 308 described herein may be enclosed such that a portion of the flow divider beam 308 extends between the downstream ends 328 along at least a portion of the length of the flow divider beams 308, such as adjacent to the hub 306.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed:

1. A sensor assembly for use within a flow conduit of an exhaust treatment system of a work vehicle, the flow conduit including an upstream end and a downstream end, the flow conduit configured to receive a treated exhaust at the upstream end for flow towards the downstream end, the sensor assembly comprising:
   an exhaust sensor positioned within the flow conduit between the upstream and downstream ends, the exhaust sensor being configured to detect an amount of an emission gas present in the treated exhaust; and
   a sensor shield positioned within the flow conduit upstream of the exhaust sensor, the sensor shield comprising a central hub and a plurality of flow divider beams, each flow divider beam including a proximal end coupled to or formed with the central hub and a distal end opposite the proximal end, the plurality of flow divider beams extending radially outwardly from the central hub such that the distal end of each flow divider beam is spaced apart radially outwardly from the central hub, the sensor shield creating a wake area downstream of the central hub within which a turbulent exhaust flow is generated as the treated exhaust is directed past the sensor shield, the exhaust sensor configured to receive the turbulent exhaust flow from the wake area, wherein each flow divider beam is curved in an upstream direction between the proximal and distal ends of said flow divider beam such that the distal end of said flow divider beam is positioned upstream of the central hub.

2. The sensor assembly of claim 1, wherein each flow divider beam further comprises an upstream surface and at least one downstream edge, and wherein each flow divider beam defines a divider flowpath within a cross-section of each flow divider beam, the divider flowpath extending from the distal end of the flow divider beam to the central hub such that each flow divider beam is configured to funnel a portion of the treated exhaust from the distal end to the wake area.

3. The sensor assembly of claim 2, wherein each flow divider beam defines a cross-sectional length between the upstream surface and the at least one downstream edge that increases from the distal end to the central hub.

4. The sensor assembly of claim 2, wherein the plurality of flow divider beams comprises a plurality of curved beams, the plurality of curved beams each defining a curved cross-section.

5. The sensor assembly of claim 1, wherein the exhaust sensor is a nitrous oxide (NOx) sensor.

6. The sensor assembly of claim 1, further comprising:
   a sensor conduit including an inlet end, the sensor conduit positioned downstream of the sensor shield and housing the exhaust sensor, wherein the inlet end is generally aligned with the central hub of the sensor shield and is positioned within the wake area downstream of the sensor shield such that the sensor conduit defines a suction flowpath between the inlet end and the exhaust sensor such that wake area is in flow communication with the exhaust sensor via the suction flowpath.

7. The sensor assembly of claim 6, wherein the sensor conduit further includes an outlet, wherein the sensor conduit is configured such that a flow of the treated exhaust past the outlet generates a suction force that directs the turbulent exhaust flow from the wake area and through the suction flowpath such that the turbulent exhaust flow is directed over the exhaust sensor before being expelled at the outlet.

8. The sensor assembly of claim 1, wherein the central hub is generally aligned with a centerline of the sensor shield and is configured to block the treated exhaust from flowing along the centerline as the treated exhaust is directed past the sensor shield.

9. An exhaust treatment system for a work vehicle, the system comprising:
   a selective catalytic reduction (SCR) system configured to react a mixture of exhaust reductant and engine exhaust with a catalyst to generate a treated exhaust, the SCR system including an SCR outlet for expelling the treated exhaust therefrom;
   a flow conduit including an upstream end and a downstream end, the flow conduit in fluid communication with the SCR outlet for receiving the treated exhaust expelled from the SCR system;
   an exhaust sensor positioned within the flow conduit between the upstream and downstream ends, the exhaust sensor being configured to detect an amount of an emission gas present in the treated exhaust; and
   a sensor shield positioned within the flow conduit upstream of the exhaust sensor, the sensor shield comprising a central hub and a plurality of flow divider beams, each flow divider beam including a proximal end coupled to or formed with the central hub and a distal end opposite the proximal end, the plurality of flow divider beams extending radially outwardly from the central hub such that the distal end of each flow divider beam is spaced apart radially outwardly from the central hub, the sensor shield creating a wake area downstream of the central hub within which a turbulent exhaust flow is generated as the treated exhaust is directed past the sensor shield, the exhaust sensor configured to receive the turbulent exhaust flow from the wake area,
   wherein the central hub is generally aligned with a centerline of the sensor shield and is configured to block the treated exhaust from flowing along the centerline as the treated exhaust is directed past the sensor shield, wherein each flow divider beam is curved in an upstream direction between the proximal and distal ends of said flow divider beam such that the distal end of said flow divider beam is positioned upstream of the central hub.

10. The exhaust, treatment system of claim 9, wherein each flow divider beam further comprises an upstream surface and at least one downstream edge, and wherein each flow divider beam defines a divider flowpath within a cross-section of each flow divider beam, the divider flowpath extending from the distal end of the flow divider beam to the central hub such that each flow divider beam is configured to funnel a portion of the treated exhaust from the distal end to the wake area.

11. The exhaust treatment system of claim 10, wherein each flow divider beam defines a cross-sectional length between the upstream surface and the at least one downstream edge that increases from the distal end to the central hub.

12. The exhaust treatment system of claim 10, wherein the plurality of flow divider beams comprises a plurality of curved beams, the plurality of curved beams each defining a curved cross-section.

13. The exhaust treatment system of claim 10, wherein the distal end of each flow divider beam is supported by the flow conduit at a location spaced apart radially outwardly from the central hub.

14. The exhaust treatment system of claim 9, further comprising
a sensor conduit including an inlet end, the sensor conduit positioned downstream of the sensor shield and housing the exhaust sensor, wherein the inlet end is generally aligned with the central hub of the sensor shield and is positioned within the wake area downstream of the sensor shield such that the sensor conduit defines a suction flowpath between the inlet end and the exhaust sensor such that wake area is in flow communication with the exhaust sensor via the suction flowpath.

15. The exhaust treatment system of claim 14, wherein the sensor conduit further includes an outlet, wherein the sensor conduit is configured such that a flow of the treated exhaust past the outlet generates a suction force that directs the turbulent exhaust flow from the wake area and through the suction flowpath such that the turbulent exhaust flow is directed over the exhaust sensor before being expelled at the outlet.

16. The exhaust treatment system of claim 9, wherein the central hub comprises a bluff body.

17. The exhaust treatment system of claim 14, wherein the inlet end of the sensor conduit is generally aligned with the centerline of the sensor shield, the central hub being configured to block treating exhaust from flowing along the centerline to the inlet end of the sensor conduit.

18. The sensor assembly of claim 17, wherein the central huh comprises a bluff body.

* * * * *